UNITED STATES PATENT OFFICE.

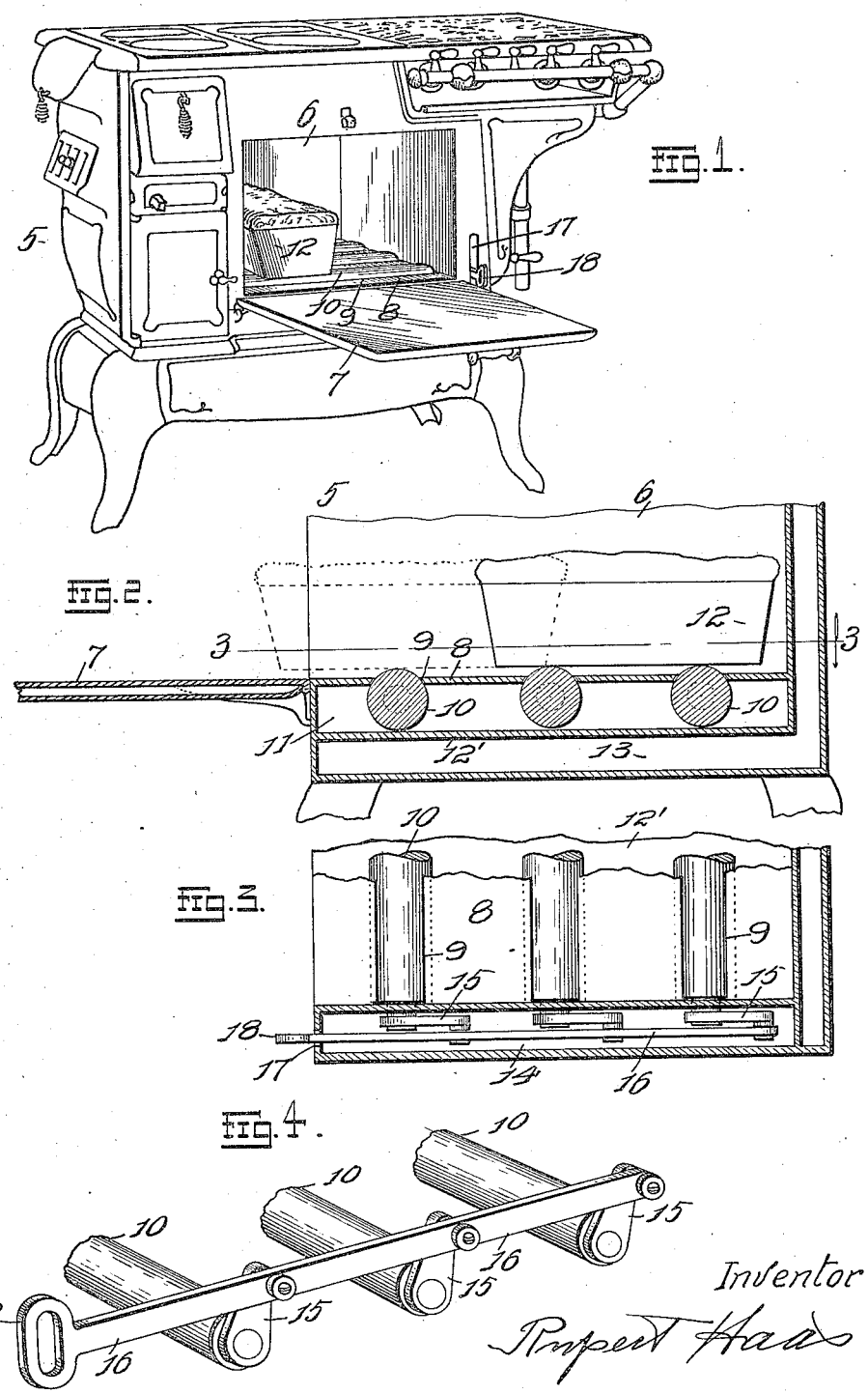

RUPERT HAAS, OF ST. LOUIS, MISSOURI.

UTENSIL-HANDLING DEVICE FOR BAKE OVENS.

1,423,320.　　　　　Specification of Letters Patent.　　Patented July 18, 1922.

Application filed July 18, 1921. Serial No. 485,471.

*To all whom it may concern:*

Be it known that I, RUPERT HAAS, a citizen of the United States, and resident of St. Louis, Mo., have invented certain new and useful Imrpovements in a Utensil-Handling Device for Bake Ovens, of which the following is a specification.

This invention relates to improvements in a utensil handling device for bake-ovens and has for its object an oven provided with a plurality of rollers located at suitable intervals apart and a means for rotating the same in either direction so as to insert or remove the utensil from the oven.

A further object of my invention is to equip the oven of an ordinary stove with a rotating mechanism and a means for rotating the same so that the utensil may be removed from the oven for inspection during the baking process, and can again be returned by the mechanism.

This mechanism is especially designed to prevent the scorching of the hands in handling the articles.

Figure 1, is a perspective view of a stove showing my invention located therein.

Fig. 2, is a cross-sectional view of a portion of the oven showing the arrangement and position of the rollers.

Fig. 3, is a horizontal sectional view of the same taken on the line 3—3 of Fig. 2.

Fig. 4, is a detail perspective view of a portion of my invention detached.

Referring to the drawings in detail 5 indicates an ordinary stove, 6 an oven and 7 a door. The bottom 8 of the oven is provided with a suitable number of elongated openings 9 through which a portion of the rollers 10 may project, and these rollers are axially mounted or rotatably supported at their ends in the side walls 11 of the stove frame, and the rollers are so positioned as to allow a small portion of the periphery to project above the bottom 8, so that the cooking or baking utensil 12 may contact with and rest upon two or more of the rollers at the same time.

In order to shield the rollers from the passage of combustion I provide the stove with an auxiliary bottom 12' which encases said rollers and prevents soot from contacting, and beneath this partition is the under combustion chamber 13 through which the heat circulates.

On one side of the oven I provide a suitable compartment 14, in this compartment is located a lever mechanism for rotating the rollers.

On the end of each of the rollers 10 I provide a crank arm 15 and the free end of the crank arms are pivotally connected to an operating lever 16, the front ends of the lever projecting through the slot 17 formed in the stove casing, and said end of the lever is converted into a handle 18 by which the mechanism may be operated.

The operation of my invention is as follows:

When a utensil is placed in the oven and after the same has remained therein for a given period and in order to remove the same from its inserted position for inspection to ascertain whether the article is thoroughly baked, the door is opened, and by the manipulation of the handle 18 the rollers can be rotated in one direction so as to roll the utensil out toward the front end of the oven. Then should it be necessary to return the utensil for further baking, the handle is again operated rotating the rollers in the opposite direction which action will return the utensil to the oven.

This mechanism relieves the necessity of inserting the hands into a hot oven for removing the hot utensil.

Having fully described my invention, what I claim is.

1. A utensil handling device for bake ovens, comprising a plurality of rollers located in a bake oven, and a combined lever and crank arm mechanism for rotating said rollers in either direction.

2. A utensil handling device for bake ovens, comprising rollers axially mounted beneath the bottom of a bake oven, said rollers slightly projecting through slots formed in the oven bottom, and a lever mechanism connected to said rollers for operating the same simultaneously in either direction.

3. A device of the character described comprising a bake oven, in combination with rollers mounted in said oven and on which the baking utensils are placed, crank arms connected to said rollers, and a lever connected to said crank arms and by which the rollers are rotated simultaneously in either direction.

4. A device for handling baking utensils in bake ovens, a plurality of rollers located in the bottom of the oven and spaced a convenient distance apart, a side compartment into which the rollers project, crank arms located in the said compartment and connected to said rollers, an operating lever connected to said crank arms by which the rollers are rotated in either direction for inserting or removing the baking utensil.

In testimony whereof, I have signed my name to this specification, in presence of two subscribing witnesses.

RUPERT HAAS.

Witnesses:
 ALFRED A. EICKS,
 B. M. MANNE.